United States Patent
Lee et al.

(10) Patent No.: US 8,195,431 B2
(45) Date of Patent: Jun. 5, 2012

(54) METHOD FOR EVALUATING EFFICACY OF PREVENTION MAINTENANCE FOR A TOOL

(75) Inventors: Yi Feng Lee, Taipei County (TW); Chun Chi Chen, Taipei (TW); Shih Chang Kao, Kaohsiung (TW); Yun-Zong Tian, Taichung County (TW); Wei Jun Chen, Taichung County (TW)

(73) Assignee: Inotera Memories, Inc., Taoyuan (TW)

( * ) Notice: Subject to any disclaimer, the term of this patent is extended or adjusted under 35 U.S.C. 154(b) by 370 days.

(21) Appl. No.: 12/566,974

(22) Filed: Sep. 25, 2009

(65) Prior Publication Data
US 2011/0010132 A1    Jan. 13, 2011

(30) Foreign Application Priority Data

Jul. 8, 2009   (TW) ................................ 98123040 A

(51) Int. Cl.
  G06F 15/00  (2006.01)
  G06F 19/00  (2011.01)
(52) U.S. Cl. ...................................................... 702/184
(58) Field of Classification Search .................. 702/184; 700/108, 121; 430/5
See application file for complete search history.

(56) References Cited

U.S. PATENT DOCUMENTS

2010/0234978 A1*   9/2010   Lee et al. ...................... 700/110
* cited by examiner Primary Examiner — Bryan Bui
(74) Attorney, Agent, or Firm — Rosenberg, Klein & Lee

(57) ABSTRACT

A method for evaluating efficacy of prevention maintenance for a tool includes the steps of: choosing a tool which has been maintained preventively and choosing a productive parameter of the tool; collecting values of the productive parameter generated from the tool during a time range for building a varying curve of the productive parameter versus time, modifying the varying curve with a moving average method; transforming the varying curve into a Cumulative Sum chart; and judging whether the values of the productive parameter generated from the tool after the prevention maintenance are more stable, compared with the values of the productive parameter generated from the tool before the prevention maintenance, according to the Cumulative Sum chart. Thereby, if the varying of the values of the productive parameter after the prevention maintenance isn't stable, then the efficacy of this prevention maintenance for the tool is judged not good.

13 Claims, 5 Drawing Sheets

METHOD FOR EVALUATING EFFICACY OF PREVENTION MAINTENANCE FOR A TOOL

BACKGROUND OF THE INVENTION

1. Field of the Invention

The present invention relates to an evaluating method, and more particularly to a method for evaluating efficacy of prevention maintenance for a tool.

2. Description of Related Art

For manufacturing equipments, prevention maintenances (PM) for tools are very important works. Good prevention maintenance time arrangements can improve productivity and yield of the whole manufacturing equipments and the availability of the tools. On the contrary, an improper prevention maintenance time arrangement not only reduces productivity and yield, but also causes tool failure.

For equipments with high manufacturing costs and precision equipments, prevention maintenances are more important. For example, in semiconductor processes, when wafers are lapped by a lapping tool, recourse costs of basic consumables are wasted if the prevention maintenances are executed too early. Because it takes at least two or three hours, even one day, to execute one prevention maintenance, so the usage rate of the lapping tool decreases, and further the productivity decreases. On the contrary, if the prevention maintenances are executed too late, the demand of size precision of products cannot be achieved, which reduces the yield of the whole products and even causes the failure of the whole lapping tool.

At present, most of semiconductor manufacturers do the prevention maintenances for semiconductor tools regularly, that is, semiconductor tools are maintained preventively at fixed intervals. After semiconductor tools are maintained preventively, it is believed that the semiconductor tools are adjusted to be in a good state, manufacturing capacities of the semiconductor tools meet the demands and the yield of wafer production is improved.

However, in fact, it cannot ensure that prevention maintenances of semiconductor tools are helpful to wafer production. It is possible that wafers processed by the semiconductor tools which have just been preventively maintained, still have reduced yield.

Accordingly, how to evaluate correctly efficacy of prevention maintenances on wafer production is a problem to be solved.

Hence, the inventors of the present invention believe that the shortcomings described above are able to be improved and finally suggest the present invention which is of a reasonable design and is an effective improvement based on deep research and thought.

SUMMARY OF THE INVENTION

A main object of the present invention is to provide a method for evaluating efficacy of prevention maintenance for a tool, which can judge the efficacy of prevention maintenances for a tool by comparing values of productive parameters before and after the prevention maintenances.

To achieve the above-mentioned object, a method for evaluating efficacy of prevention maintenance for a tool in accordance with the present invention is provided. The method comprises the steps of: (a). choosing a tool which has been maintained preventively and choosing a productive parameter of the tool; (b). collecting values of the productive parameter generated from the tool during a time range for building a varying curve of the productive parameter versus time, wherein a starting point of the time range is a first predetermined number of days before the prevention maintenance for the tool and an ending point of the time range is a second predetermined number of days after the prevention maintenance for the tool; (c). modifying the varying curve of the productive parameter versus time with a moving average method; (d). transforming the varying curve of the productive parameter versus time into a Cumulative Sum chart; and (e). judging whether the values of the productive parameter generated from the tool after the prevention maintenance are more stable, compared with the values of the productive parameter generated from the tool before the prevention maintenance, according to the Cumulative Sum chart.

The present invention further provides a program product for performing the above-mentioned method for evaluating efficacy of prevention maintenance for a tool. The program product includes a plurality of program codes.

The efficacy of the method for evaluating efficacy of prevention maintenance for a tool of the present invention is as follows: the varying of the values of the productive parameter before and after the prevention maintenance can be obviously determined according to the moving average method and the Cumulative Sum chart. If the varying of the values of the productive parameter after the prevention maintenance isn't stable, then the efficacy of this prevention maintenance for the tool will be judged not good.

To further understand features and technical contents of the present invention, please refer to the following detailed description and drawings related the present invention. However, the drawings are only to be used as references and explanations, not to limit the present invention.

DETAILED DESCRIPTION OF THE PREFERRED EMBODIMENTS

The present invention provides a method for evaluating efficacy of prevention maintenance for a tool (the following is called evaluating method for short) which can evaluate whether prevention maintenances (PM) for a tool are helpful to stabilization of productive parameters of the tool. The evaluating method of the present invention can be applied in various tools, and more helpful to wafer production tools in semiconductor manufacturers.

The evaluating method of the present invention may be executed by a processor of an electronic product, for example, a computer, or an integrated circuit chip which is mounted in an electronic product and connected with other circuit components of the electronic product.

The following is to describe the evaluating method of the present invention. Take a lithograph tool for an example to explain the evaluating method of the present invention. The lithograph tool can do the development process for wafers, and transfer mask patterns to a photoresist material on surfaces of the wafers.

Figure 1:
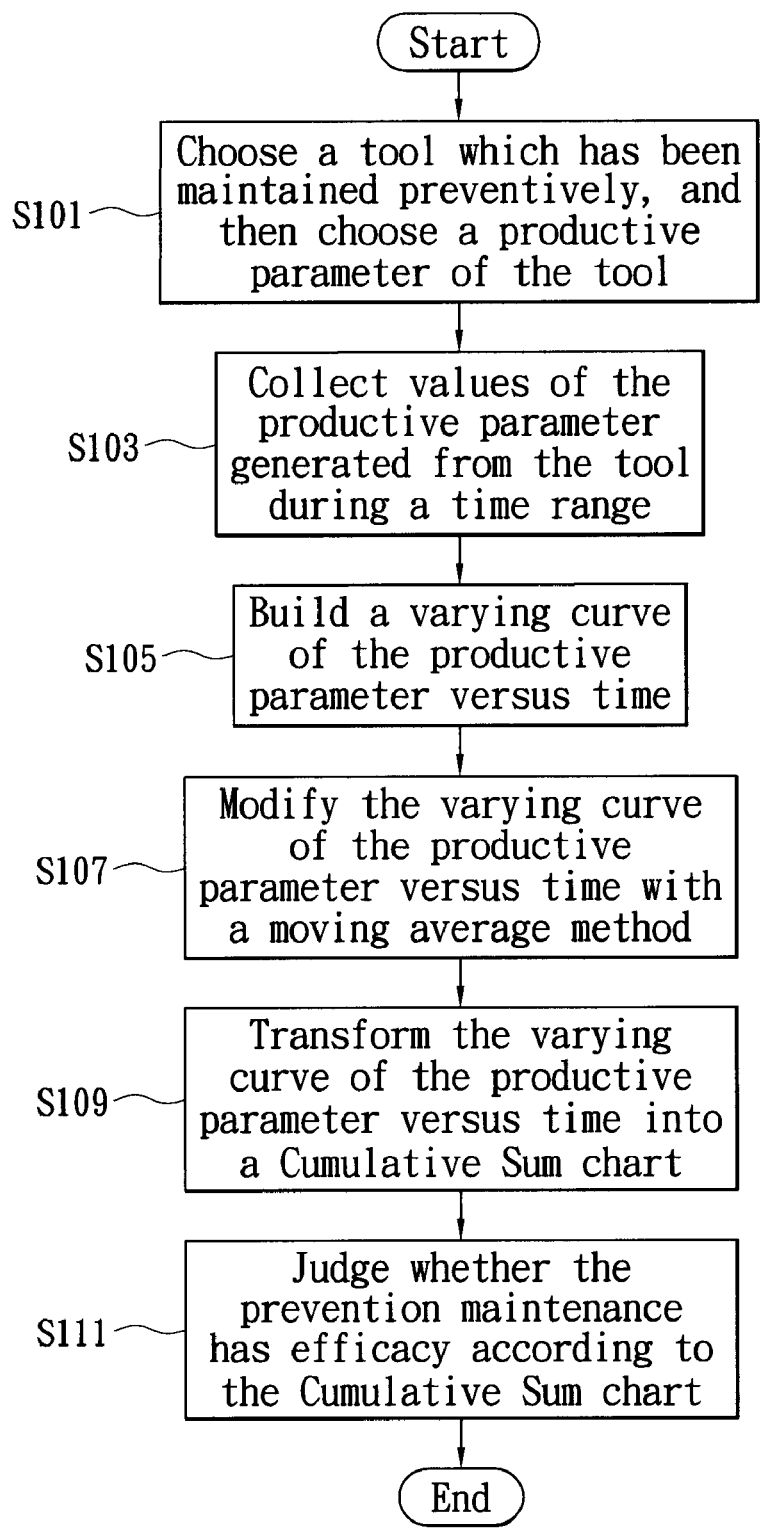
FIG. 1 is a flow chart of a first preferred embodiment of a method for evaluating efficacy of prevention maintenance for a tool of the present invention.

Please refer to FIG. 1 illustrating a first preferred embodiment of the evaluating method of the present invention.

At first, choose a lithograph tool (a tool) which has been maintained preventively, and then choose a productive parameter of the lithograph tool (Step S101). The productive parameter is a foundation for evaluating efficacy of the prevention maintenance, and generated with the lithograph tool processing the wafers. The productive parameter isn't limited in variety, but preferably a key productive parameter. In the embodiment, a vertical offset value, which denotes mask overlay precision, is chosen to express the amount that the mask is offset from a predetermined position in the vertical direction.

After the productive parameter is chosen, collect values of the productive parameter (the vertical offset value) generated from the tool (the lithograph tool) during a time range (Step S103). A starting point of the time range is a first predetermined number of days before the prevention maintenance for the lithograph tool and an ending point of the time range is a second predetermined number of days after the prevention maintenance for the lithograph tool. The first predetermined number of days may be equal or unequal to the second predetermined number of days, and in the embodiment, the chosen first predetermined number of days and second predetermined number of days all are three days. In other words, the time range is from three days before the prevention maintenance for the lithograph tool to three days after the prevention maintenance for the lithograph tool.

Figure 2:
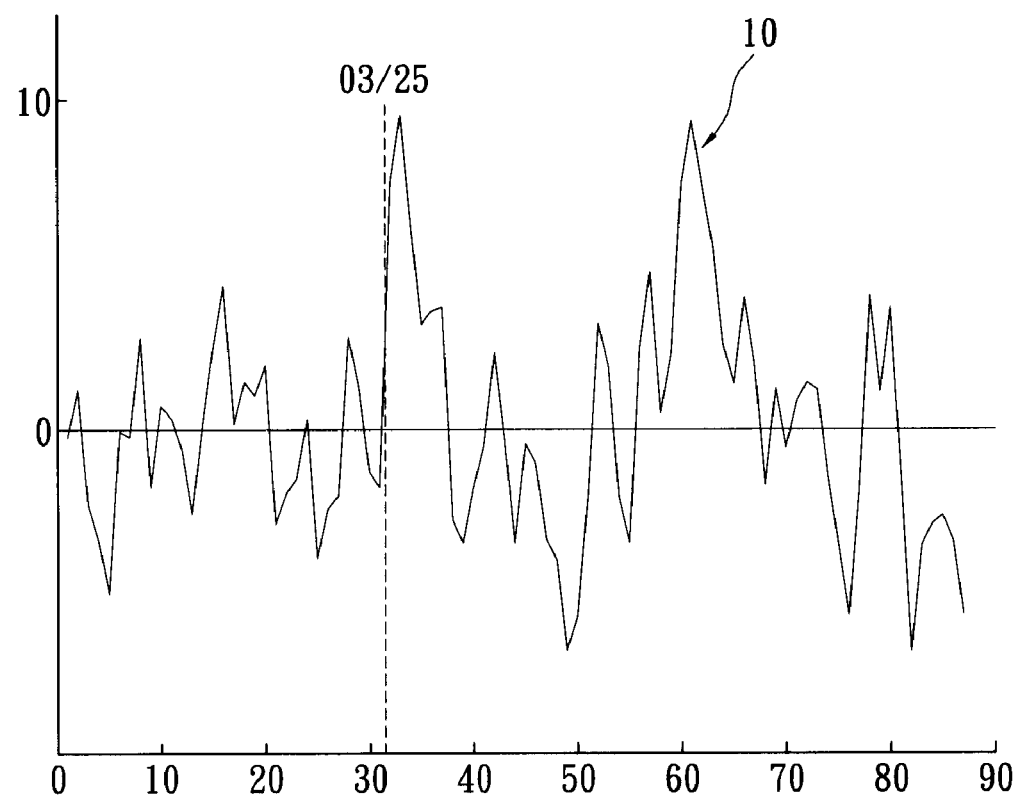
FIG. 2 is a schematic view of a varying curve of productive parameter versus time of the present invention.

After collecting a plurality of values of the productive parameter (the vertical offset value), build a varying curve of the productive parameter versus time (Step S105) which is called as the varying curve in short in the following description. Please refer to FIG. 2, the lithograph tool is maintained preventively on March 25, so the varying curve 10 starts on March 22 and ends on March 28, and consists of about 88 values of the productive parameter. Each value of the productive parameter represents that the lithograph tool processes a lot of wafers, so 88 lots of wafers are processed by the lithograph tool from March 22 to March 28.

In the next step, modify the varying curve of the productive parameter versus time 10 with a moving average method (Step S107). In detail, it is difficult to observe the varying trend of the original varying curve 10 and some disorder information affects the following steps, so the moving average method is used for improvement.

Then transform the varying curve 10 into a Cumulative Sum chart or CUSUM chart (Step S109). The Cumulative Sum chart is one kind of control chart in statistics, which is characterized as finding tiny changes during the process. Please refer to FIG. 3, after the varying curve 10 is transformed into the Cumulative Sum chart, the Cumulative Sum chart has a plurality of blocks of which directions and length respectively express the varying trend and the varying severe degree of the varying curve 10.

Finally, judge whether the prevention maintenance has efficacy according to the Cumulative Sum chart (Step S111). In detail, if the productive parameter generated from the tool after the prevention maintenance is more stable, compared with the values of the productive parameter generated from the tool before the prevention maintenance, the prevention maintenance is judged to have the efficacy. The stability of the productive parameter may be judged based on whether the productive parameters are easy to be offset from a desired value, and if it is easy, then the productive parameter isn't stable.

Figure 3:
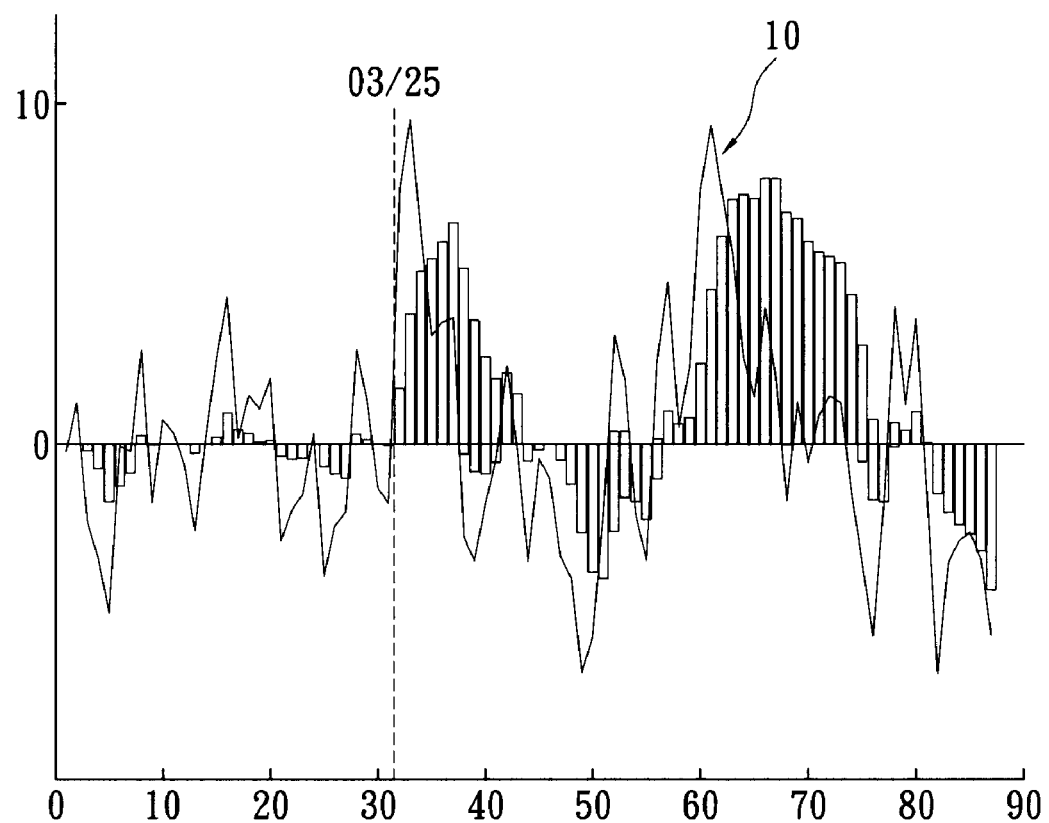
FIG. 3 is a schematic view of a Cumulative Sum chart of the present invention.

For example, in the case as shown FIG. 3, the vertical offset value has fewer changes during the three days before the prevention maintenance but more changes during the three days after the prevention maintenance. That is, the blocks have small length during the three days before the prevention maintenance, and become longer after the prevention maintenance. So the prevention maintenance executed on March 25 is unhelpful to the stability of the productive parameter, and then the efficacy of the prevention maintenance is judged to be not good. Engineers may think over the reason why this situation occurs and then improve it, so that the next prevention maintenance can achieve the beneficial efficacy indeed.

The above-mentioned steps can be executed for different productive parameters, not limited in a single productive parameter. Please refer to FIG. 4, the evaluating method of the present invention is applied in another productive parameter: a horizontal offset value, and obtains a Cumulative Sum chart for the horizontal offset value, wherein the horizontal offset value expresses the amount that the mask is offset from a predetermined position in the horizontal direction. Similarly, based on the changes between the productive parameters generated before and after the prevention maintenance, it is judged whether the prevention maintenance has efficacy. The result shows that the prevention maintenance isn't so helpful to the stability of the productive parameter.

Figure 5:
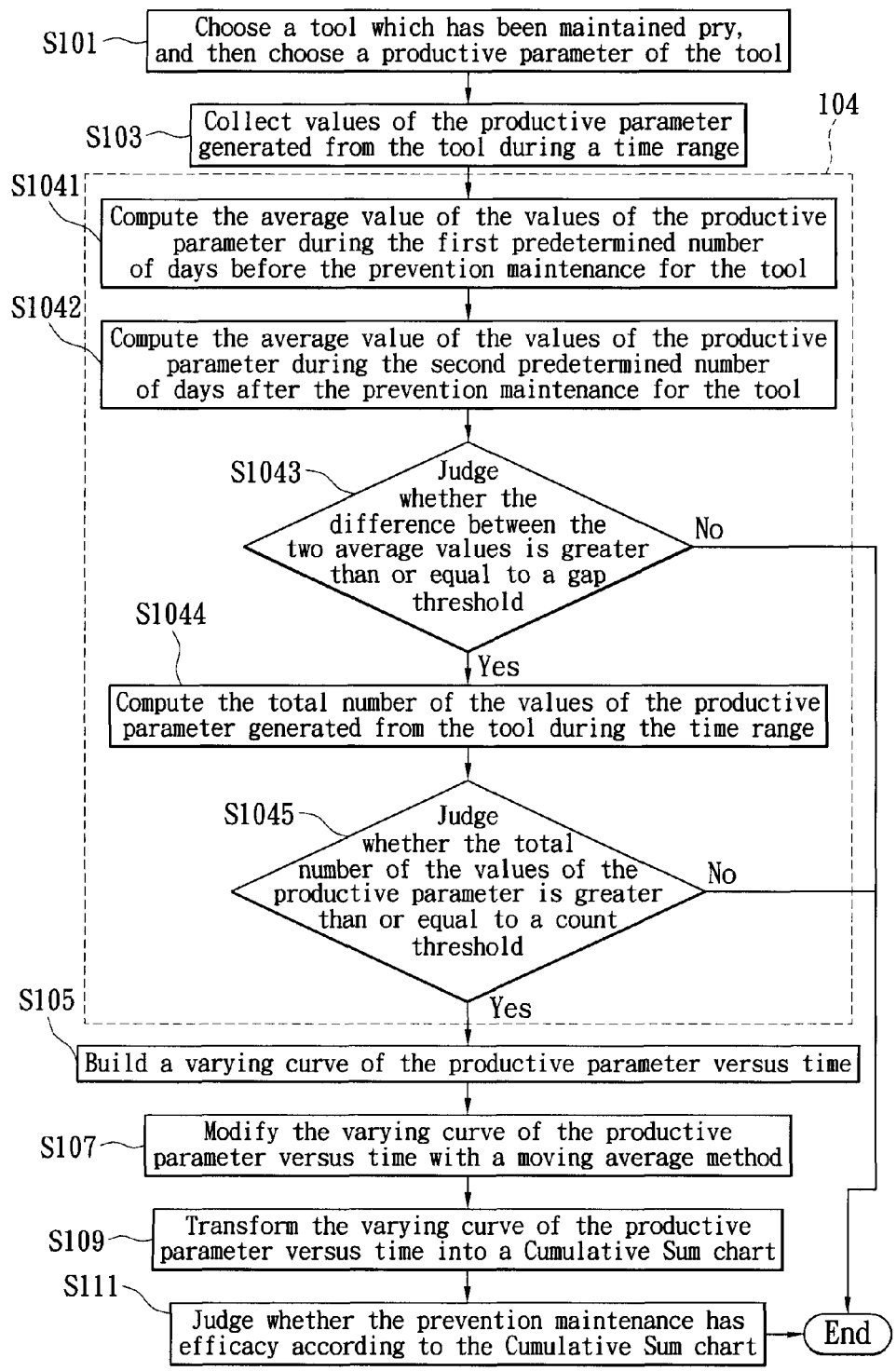
FIG. 5 is a flow chart of a second preferred embodiment of the method for evaluating efficacy of prevention maintenance for a tool of the present invention.

Please refer to FIG. 5, the evaluating method of the present invention has a second preferred embodiment which has the basic flow similar to the first preferred embodiment. The second preferred embodiment has the steps S101, S102, S105, S107, S109 and S111, and another step S104.

The step S104 is executed after the step S103 for ensuring that the evaluating method is more efficient. The step S104 includes several secondary steps, and the description is as follows.

At first, after the values of the productive parameter are collected, compute the average value of the values of the productive parameter during the three days before the prevention maintenance for the tool (the first predetermined number of days) (Step S1041). That is, the values of the productive parameter during the three days are added together, and then the sum is divided by the total number of the values of the productive parameter during the three days before the prevention maintenance, thereby achieving the average value.

Then, similarly, compute the average value of the values of the productive parameter during the three days after the prevention maintenance for the tool (the second predetermined number of days) (Step S1042). Further, compute the difference between the two average values, and then judge whether the difference is greater than or equal to a gap threshold (Step S1043).

If the judgment is that the difference is below the gap threshold, then it means that the difference between the values of the productive parameter generated before and after the prevention maintenance is unobvious, so the subsequent steps are omitted. If the judgment is that the difference isn't below the gap threshold, then the subsequent steps are executed continuously.

Figure 4:
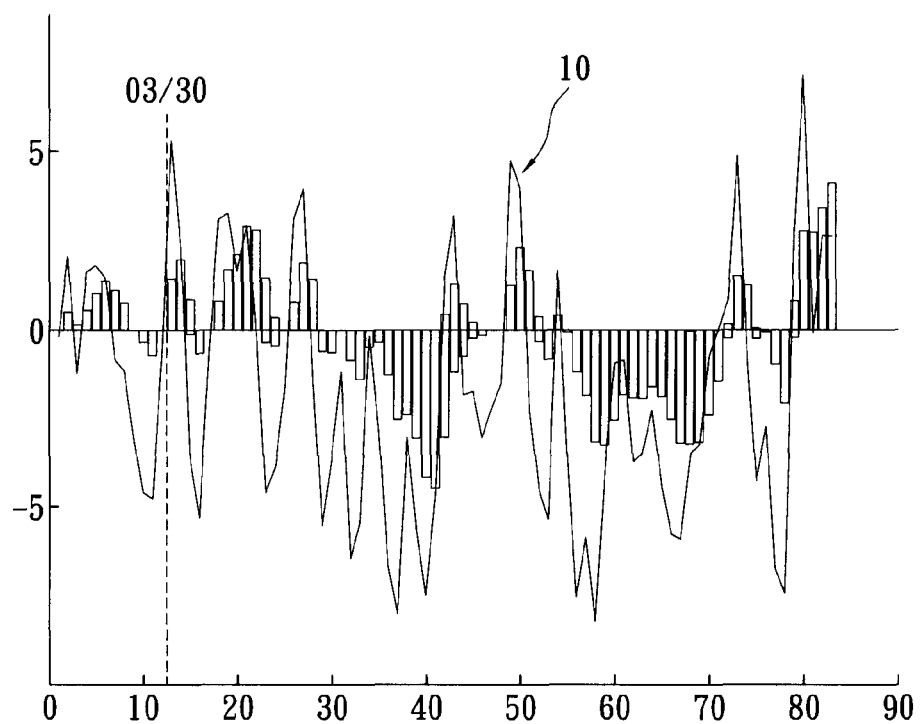
FIG. 4 is a schematic view of another Cumulative Sum chart of the present invention.

Then compute the total number of the values of the productive parameter generated from the tool during the time range (Step S1044), that is, compute how many lots of wafers are processed by the tool during the time range. For example, there are 88 values of the productive parameter (88 lots of wafers) as shown in FIG. 4. Then judge whether the total number of the values of the productive parameter is greater than or equal to a count threshold (Step S1045).

Similarly, if the judgment is that the total number of the values of the productive parameter is below the count threshold, then it means that the total number of the values of the productive parameter isn't enough, so the subsequent steps are omitted. If the total number of the values of the productive parameter isn't below the count threshold, then the subsequent steps are executed continuously.

That is, the second preferred embodiment can screen some varying curves of the productive parameter versus time, which are improper to the judgment whether the prevention maintenance has the efficacy.

Furthermore, the same efficacy can be achieved when the step S104 is executed after the step S105, and the steps S1044-S1045 are executed before the steps S1041-S1043.

Consequently, the evaluating method of the present invention can analyze the varying of the values of the productive parameter before and after the prevention maintenance according to the moving average method and the Cumulative Sum chart, and then evaluate whether the prevention maintenance for the tool is effective according to the stability of the varying of the values of the productive parameter after the prevention maintenance.

The present invention further provides a program product which includes a plurality of program codes for performing the methods for evaluating efficacy of prevention maintenance for a tool of the above-mentioned embodiments. The program product may be stored in a storage medium (such as a hard disk or a memory) of an electronic product via networks or compact discs, and the program product further is loaded in a processor of the electronic product, thereby executing the above-mentioned methods for evaluating efficacy of prevention maintenance for a tool on the electronic product.

What are disclosed above are only the specification and the drawings of the preferred embodiments of the present invention and it is therefore not intended that the present invention be limited to the particular embodiments disclosed. It will be understood by those skilled in the art that various equivalent changes may be made depending on the specification and the drawings of the present invention without departing from the scope of the present invention.

What is claimed is:

1. A method for evaluating efficacy of prevention maintenance for a tool, comprising the steps of:
    (a). choosing a tool which has been maintained preventively and choosing a productive parameter of the tool;
    (b). collecting values of the productive parameter generated from the tool during a time range for building a varying curve of the productive parameter versus time, wherein a starting point of the time range is a first predetermined number of days before the prevention maintenance for the tool and an ending point of the time range is a second predetermined number of days after the prevention maintenance for the tool;
    (c). modifying the varying curve of the productive parameter versus time with a moving average method;
    (d). transforming the varying curve of the productive parameter versus time into a Cumulative Sum chart; and
    (e). judging whether the values of the productive parameter generated from the tool after the prevention maintenance are more stable, compared with the values of the productive parameter generated from the tool before the prevention maintenance, according to the Cumulative Sum chart.

2. The method as claimed in claim 1, wherein the first predetermined number of days is equal to the second predetermined number of days.

3. The method as claimed in claim 2, wherein the first predetermined number of days and the second predetermined number of days are defined as three days.

4. The method as claimed in claim 1, wherein after the step (b), there further are the steps of:
    computing an average value of the values of the productive parameter before the prevention maintenance for the tool on the first predetermined number of days;
    computing an average value of the values of the productive parameter after the prevention maintenance for the tool on the second predetermined number of days; and
    judging whether a difference between the two average values is greater than or equal to a gap threshold.

5. The method as claimed in claim 4, wherein after the step (b), there further are the steps of:
    computing a total number of the values of the productive parameter generated from the tool during the time range; and
    judging whether the total number of the values of the productive parameter is greater than or equal to a count threshold.

6. The method as claimed in claim 1, wherein after the step (b), there further are the steps of:
    computing a total number of the values of the productive parameter generated from the tool during the time range; and
    judging whether the total number of the values of the productive parameter is greater than or equal to a count threshold.

7. The method as claimed in claim 6, wherein after the step (b), there further are the steps of:
    computing an average value of the values of the productive parameter before the prevention maintenance for the tool on the first predetermined number of days;
    computing an average value of the values of the productive parameter after the prevention maintenance for the tool on the second predetermined number of days; and
    judging whether a difference between the two average values is greater than or equal to a gap threshold.

8. The method as claimed in claim 1, wherein the tool is a tool for processing wafers.

9. The method as claimed in claim 8, wherein the tool is a lithograph tool.

10. The method as claimed in claim 9, wherein the productive parameter is a horizontal offset value.

11. The method as claimed in claim 9, wherein the productive parameter is a vertical offset value.

12. A program product for performing the method for evaluating efficacy of prevention maintenance for a tool as claimed in claim 1, comprising: a plurality of program codes.

13. The program product as claimed in claim 12, being stored in a storage medium of an electronic product, wherein when the program product is loaded in a processor of the electronic product, the program product executes the method for evaluating efficacy of prevention maintenance.

* * * * *